Figure 1:
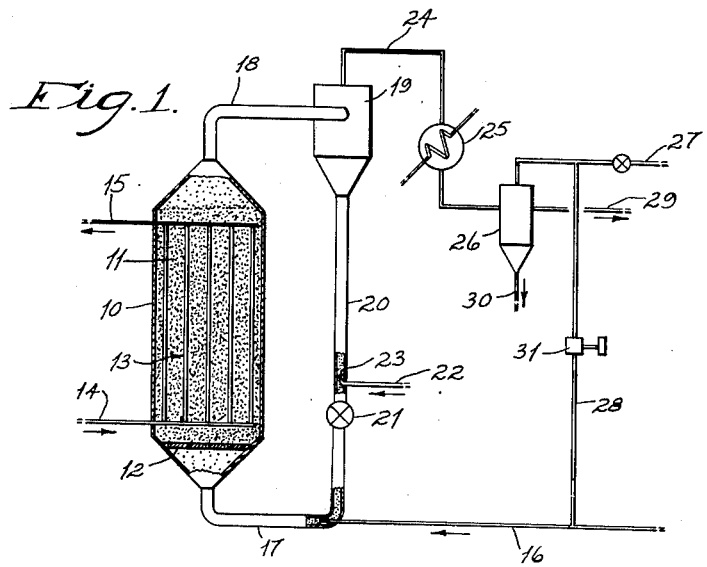

Nov. 24, 1953    F. D. HOFFERT    2,660,598
CATALYTIC CONVERSION OF GASEOUS REACTANTS
Filed June 24, 1947

*INVENTOR.*
FRANK D. HOFFERT
BY Daniel Stryker
J. H. Grahame
*ATTORNEYS*

Patented Nov. 24, 1953

2,660,598

UNITED STATES PATENT OFFICE 2,660,598

CATALYTIC CONVERSION OF GASEOUS REACTANTS

Frank D. Hoffert, Trenton, N. J., assignor to Hydrocarbon Research, Inc., New York, N. Y., a corporation of New Jersey Application June 24, 1947, Serial No. 756,661

4 Claims. (Cl. 260—449)

The present invention relates to the catalytic conversion of gaseous or gasiform reactants into synthetic products by processes involving generation or consumption of thermal energy, and more particularly is concerned with carrying out fixed or static bed catalytic operations under the advantages prevailing in "fluid" systems.

The present invention relates to the continuous operation of catalytic processes as above in the presence of a catalyst composed of relatively large particles maintained in a mass or bed under relatively static or quiescent conditions, and in heat transfer relationship to suitable cooling or heating surfaces, as the case may be, disposed throughout the catalyst mass, the voids, interstices or passages between the catalyst particles being occupied by a fluid phase of relatively finely divided solid material suspended in the gaseous reactants. Under these conditions, the fine, suspended particles of the fluid phase, characteristically vibrating in the voids between the catalyst particles, function to improve the transfer of heat energy between the surfaces of the catalyst and the heat transfer surfaces.

Thus, for example, in an exothermic reaction such as that involving the synthesis of hydrocarbons, oxygenated hydrocarbons, and the like, active catalyst surfaces spaced from cooling surfaces are continuously cooled by transfer of heat through the fluid phase along paths extending through catalyst interstices to adjacent cooling surfaces. With the finely divided powder in a typical state of dense phase fluidization, the character of the heat transfer between catalyst surfaces and the cooling surface closely approaches that of a boiling liquid in contact with such heat transfer surfaces. Thus, the invention provides a system whereby a non-fluidized bed catalytic process may be operated under the advantageous conditions of temperature control typical of "fluid" catalytic operation.

The invention is likewise applicable to endothermic processes wherein the fluid phase functions in the same way to transfer thermal energy to the region of the catalyst surfaces from any desired source.

The terms "quiescent" or "static" as used herein, with reference to contact mass character and use, mean a catalyst in non-fluidized condition, that is to say, in a condition wherein the particles are in relative repose with respect to one another in that they are not materially buoyed up or suspended in the flow of reactant gases, and accordingly are not subjected to the characteristic vibratory or random movement which characterizes the condition of fluidization. These terms therefore contemplate fixed bed operation as well as operations wherein the catalyst particles are subjected to simple gravitation or conveyance through the reaction zone.

As intimated above, the catalyst possesses a particle size and form which assures a generally static or quiescent condition during the upward passage of the reactant gases. This means that the so-called settling rate of the catalyst particles as determined, for example, by their size, shape and density, resist mechanical displacement by the upflow of reactant gases. Accordingly, the size of the particles may vary within wide limits depending upon the rate of reactant flow, preferably being predetermined by trial.

By way of example, the catalyst in the form of granules of the order of one-quarter to one-half inch across will usually remain static under all flow velocities met with in practice. The granules may take an irregular form or else be present in the shape of pellets, rings, spheres, particles and the like. Moreover, for relatively low reactant flow velocities, the catalyst may have smaller dimensions. It is to be understood, however, that the form and arrangement of the granules is such as to provide continuous passages through the mass.

Referring, for purposes of illustration, to the hydrocarbon synthesis to which the present invention is most advantageously applicable, the catalyst may comprise a metal of the iron group or ruthenium, either as such or supported on a suitable carrier, such as diatomaceous earth, silica gel, Filtrol, etc. It may include conventional activators and promoters such as the oxides of the alkali or alkaline earth metals or alumina, thoria, magnesia, vanadia and the like. It is to be understood that the present invention, in its broadest aspect, is not limited to the use of any specific type of known catalyst and, involving as it does conventional methods of catalyst preparation and forming, these details form no part thereof, except insofar as the catalyst possesses the required particle size and form.

The fluidized phase is selected from a powder composed of discrete solid particles of such relative size and form that they pass freely through the passages in the catalyst bed and are readily aerated by and suspended in the gaseous reactant flow, advantageously as a dense fluid phase. To this end, the powder may be composed of any, preferably abrasion resistant, solid material capable of being readily powdered. Such, for example, are powdered zirconia, magnesia, fly ash, Carborundum and even metallic particles such as copper, aluminum and the like. Powdered sand, glass and other vitreous materials are equally suitable. Particles with dark surfaces are particularly advantageous in providing optimum black body conditions which enhance the desired heat transfer effect. To this end, powdered coke and graphite are useful. In short, the fluid phase more or less broadly includes any material which tends to remain in powdered, solid form under the conditions of the reaction and which does not impair the desired reaction.

While, as indicated above, the degree of subdivision of the powder may vary widely depending on the linear rate of gas flow prevailing, nevertheless it is usually below 100 mesh and preferably below 200 mesh in size and frequently as fine as 325 mesh and finer. Such a powder may be readily subjected to predetermined dense phase fluidization by reasonable adjustment of the rate of reactant flow.

While in some instances, particularly with moderate conditions of gas flow, the dense fluid phase will tend to distribute in the voids and passages of the catalyst mass without special handling, it is usually advantageous and advisable to maintain uniform distribution by circulating the powder continuously to the lower portion of the contact mass and making a corresponding withdrawal in the effluent product gas to afford a continual supply to the catalyst voids, minimize size classification of the powder, and also to compensate for powder lost overhead in the effluent stream of reaction products where circulation is not practiced. This enables the system to be operated with a wider latitude of increased reactant flow velocities to meet varying requirements of contact and can be readily accomplished by regulated entrainment of the powder in the reaction product stream, mechanical separation and return of the solid particles to the stream of reactant feed entering the reaction zone.

Thus, the powder is continuously suspended in the inlet stream of feed gases at a rate corresponding to that at which it leaves the reaction zone, with the internal voids fully occupied by a fluid phase of predetermined apparent density.

Moreover, the rate of entrainment and thus the rate at which the catalyst is circulated, may be readily regulated by adjustment of the linear velocity of the reactant gases passing through the reaction zone. As indicated above, this arrangement has the advantage of permitting the operation of a fixed bed catalyst system with no more than negligible variation in temperature throughout the reaction zone. This contrasts strikingly with previous fixed bed reactors where, even with an excessive proportion of the catalyst bed occupied by coolant conduits interlaced with complex cooling fins and layered heat conductive sheets, reaction can not be carried out at desirably high rates without excessive localized overheating. Actually, in operation, the present invention approaches closely that condition, otherwise unattainable, which would prevail if a cooling liquid could be caused to flow directly over the catalyst surfaces during the reaction.

The present invention has the additional advantage of overcoming certain of the known defects which characterize use of the catalyst in fluidized condition. Thus, for example, the active particles maintain their desired relative position with respect to the reactant stream, and thus are continuously subjected to relatively regularized reaction conditions as contrasted with fluidized catalyst systems wherein continual top and bottom mixing of the catalyst with alternate variation in reaction conditions may tend to accelerate catalyst deterioration and decrepitation and promote undesirable side reactions. This disadvantage is particularly significant in case of the hydrocarbon synthesis mentioned above.

Moreover, the relatively large catalyst particles are in convenient condition for stripping and regeneration and may be washed in known manner with suitable organic liquid to remove accumulation of oily or waxy deposits. Obviously, such treatments may be carried out in the absence of the fluid phase, which can be removed by blowing or the like.

Figure 2:
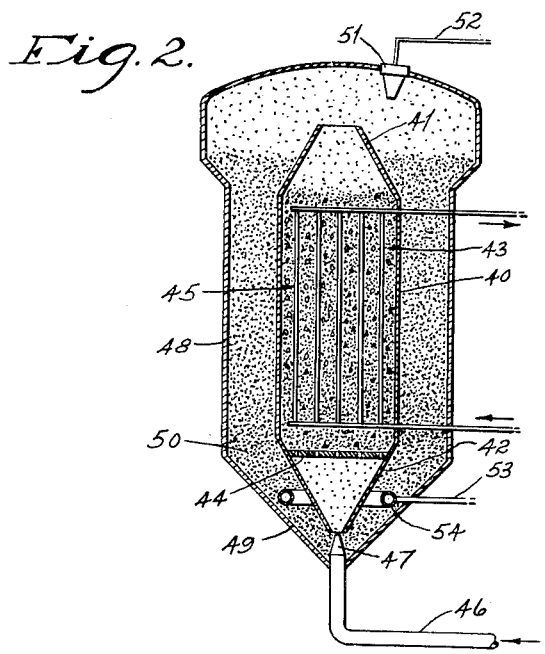

In order to more specifically describe the invention, reference is had to the accompanying drawing, Figures 1 and 2, which disclose more or less diagrammatically preferred embodiments of the invention.

In Figure 1, a reactor 10 of upstanding cylindrical form encloses a mass of granular catalyst 11, supported in a quiescent condition of repose upon a perforated screen or supporting wall 12 located near the bottom of the vessel. Advantageously, the catalyst bed is not firmly fixed, but merely rests loosely in the reaction zone to permit readjustment with expansion or contraction thereof occurring as the result of thermal or chemical change.

It is to be noted that the reaction zone contains a heat exchanger 13 extending through the space occupied by the catalyst and supplied with a suitable cooling fluid via inlet leg 14 and outlet pipe 15. The heat transfer member or exchanger 13, indicated only diagrammatically, may take any suitable form, preferably being shaped to permit relatively free, streamlined, upward passage of the reactant gases and unhindered movement of the inert powder.

The reactant gas or gases are conducted from any suitable source not shown by way of pipe 16, communicating with inlet conduit 17 to the lower frusto-conical wall of the reactor 10. The reactant gases flowing through conduit 17 pick up or entrain inert powder and convey it to the reactor and into the voids between the catalyst particles as a fluid phase.

Meanwhile, the effluent reaction products from the upper surface of the catalyst, together with entrained inert powder, pass outwardly through conduit 18 to a cyclone separation system 19 where solids drop out and move downwardly through standpipe 20 merging with the aforementioned conduit 17. Accordingly, standpipe 20 provides a continuous makeup source of inert powder adjusted to the requirements of the reaction zone. Any suitable mechanical feeder, such as a star feeder 21, permits control of powder circulation. Moreover, a suitable stripping gas such as carbon dioxide, hydrogen, flue gas or steam, may be introduced from any source not shown through pipe 22 to nozzle 23 to cleanse the inert powder or remove adherent, objectionable deposits and at the same time to promote desired fluidity in the standpipe 20.

It is to be understood that the cyclone separator 19 is only illustrative of the wide variety of known equivalents such as magnetic, electrostatic and filter separators suitable for removing solid particles from a gasiform stream.

The products of reaction, thus separated, pass through pipe 24 to condenser 25 and separator 26, from which overhead normally gaseous products may be vented as at 27 or recycled through branch pipe 28 and pump 31. Normally liquid products may be removed for use or further treatment as at 29 and 30 respectively.

In operation it will be apparent that with the reaction zone occupied by a mass of coarse granules of catalyst, the interior of the mass comprises a substantial predetermined proportion of communicating voids which are substantially uniformly occupied by a fluid phase highly effective to promote the transfer of heat between active catalyst surfaces and spaced heat transfer surfaces. For instance, in the case of the aforementioned hydrocarbon synthesis process, the temperature variation between catalyst surfaces relatively remote from the cooling surfaces and those closely adjacent the cooling surfaces may be maintained within about 5 to 10° F. limits, whereas, in the absence of the fluid phase, such variation may amount to as much as 100° F.

For example, a mixture of synthesis gas comprising essentially hydrogen and carbon monoxide in the relative molar ratio of 2:1 is passed upwardly through a mass of typical iron catalyst in the form of granules of about one-half inch in diameter. The catalyst occupies a reaction zone about 15 feet in depth and encloses a heat transfer bundle comprising a plurality of tubes about one inch in diameter spaced about 2½ inches on center throughout the mass.

Powdered graphite having a particle size of less than 200 mesh, about 85% passing a 325 mesh screen, is introduced in the inlet flow of feed gas and caused to pass upwardly therewith and occupy the voids in the catalyst bed in a condition of good dense phase fluidization by control of the reactant gas velocity to a value of about 2.5 feet per second. Pressure within the reaction zone is maintained at about 200 pounds per square inch gauge and the temperature is held at 615° F. by appropriate control of a coolant passing through the aforementioned tubes. The gasiform products of reaction withdrawn from the upper surface of the catalyst are condensed and separated showing about 98% completion of the reaction on the basis of the consumption of carbon monoxide in the entering feed gas. The hydrocarbon products include predominantly liquid hydrocarbons boiling in the motor gasoline range.

Under these conditions temperature readings taken at random in the catalyst mass both closely adjacent cooling surfaces and at points of maximum distance removed therefrom, do not show a temperature variation of more than 5° F. On the other hand, operating as above but without the fluidized powder, the catalyst at points remote from the cooling surfaces will have temperatures over 50° above the temperature of the catalyst adjacent the cooling surfaces and the production of gaseous hydrocarbons increases at the expense of desired liquid product.

An alternative embodiment of the invention is illustrated diagrammatically in Figure 2, where the reaction zone comprises a cylindrical chamber 40 having upper and lower frusto-conical wall sections 41 and 42 respectively, occupied internally by a mass of catalyst pieces or particles of the character herein referred to. Preferably, the catalyst particles repose upon a screen 44 and immerse the surfaces of heat exchanger 45 as above.

Reactant gas such as synthesis gas is introduced through inlet pipe 46 from any convenient source, and enters the lower frusto-conical section 42 of the reactor through an injector nozzle 47. An outer chamber or vessel 48 surrounding the reaction chamber 40 in co-axial, spaced relation, has a conical lower wall 49 which normally accumulates a reservoir of relatively small particle or powdered inert solid material as at 50. The injector nozzle 47 picks up the inert powder from this reservoir and directs it upwardly through the screen 48 and into the voids between the particles of catalyst under an appropriate rate of gaseous flow such that good fluid phase is maintained throughout the voids.

Any excess fluid phase entrained in the gasiform products of reaction emanating from the upper surface of the catalyst is directed out of the upper frusto-conical section 40 at a somewhat increased velocity of flow and, in the enlarged upper portion of the vessel 48, decreases in velocity and settles into the annular space between the two vessels, returning downwardly into the reservoir 50.

The gasiform reaction products, substantially separated from solid particles, pass through filter 51 to outlet pipe 52 and thence to further means, not shown, for treatment and recovery of its contained products as previously described.

Inlet pipe 53 and distributing ring 54 permit introduction of a stripping gas from any suitable source to cleanse the inert powder of inert particles and maintain it in fluent, aerated form.

From the foregoing it will be apparent that the present invention permits use of static catalyst beds in catalytic operations involving a thermal effect under conditions of improved heat control. While particular mention has been made to specific exothermic catalytic reactions, it has application, as well, to endothermic reactions, such for example, as catalytic cracking or dehydrogenation of hydrocarbons. The type catalyst employed in each case is that conventionally used for the reaction in question.

In addition to the foregoing benefits, it is pertinent to point out that the highly agitated particles of the fluid phase tend to exert a scrubbing action on the catalyst surfaces and thus to maintain the catalyst in a more or less ideal condition of activity. Since, moreover, the advantages of the preferred embodiment include revivification and stripping of the fluidized powder to eliminate any deposits thus acquired, it will be apparent that the present invention minimizes the need for the usual stripping and regeneration of the coarse catalyst particles.

Obviously, many modifications and variations of the invention as hereinbefore set forth, may be made without departing from the spirit and scope thereof, and therefore only such limitations should be imposed as are indicated in the appended claims.

I claim:

1. In the catalytic synthesis of hydrocarbons wherein a synthesis gas comprising hydrogen and carbon monoxide is passed, under reaction conditions, in contact with a fixed bed solid particle hydrocarbon synthesis catalyst in a reaction zone containing cooling surfaces subject to continuous temperature control, the improvement which comprises disposing said fixed bed of catalyst in the reaction zone about said cooling surfaces in the form of relatively coarse, solid particles having interstitial communicating voids therebetween, occupying said interstitial voids with a dense fluid phase of relatively finely divided solid particles substantially inert and non-adsorptive under the conditions of said reaction zone, said inert dense phase forming, in said interstitial voids, paths of high heat conductivity between the cooling surfaces and surfaces of the catalyst spaced therefrom, and continuously withdrawing heat from the reaction zone substantially entirely through said cooling surfaces at a controlled rate effective to maintain the catalyst at a substantially uniform predetermined reaction temperature without substantial localized variation.

2. In the catalytic reaction of gasiform reactants involving a substantial thermal effect wherein the reactants are passed under reaction conditions in contact with a fixed bed of solid particle catalyst in a reaction zone containing heat transfer surfaces subject to continuous temperature control, the improvement which comprises disposing said fixed bed of catalyst in the reaction zone about said heat transfer surfaces in the form of relatively coarse solid particles having interstitial communicating voids therebetween, occupying said interstitial voids with a dense fluid phase of relatively finely divided solid particles substantially inert and nonadsorptive under the conditions of said reaction zone, said inert dense phase forming in said interstitial voids, paths of high heat conductivity between the heat transfer surfaces and the surfaces of the catalyst spaced therefrom, and continuously passing heat through said heat transfer surfaces at a controlled rate effective to maintain the catalyst at a substantially uniform predetermined reaction temperature without substantial localized variation, the maintenance of said uniform temperature being effected substantially entirely by the passage of heat through said heat transfer surfaces.

3. The method according to claim 2 wherein the catalytic reaction involves liberation of exothermic heat energy.

4. The method according to claim 2 wherein said inert dense phase particles possess dark surfaces effective for black body conditions of heat transfer.

FRANK D. HOFFERT.

References Cited in the file of this patent

UNITED STATES PATENTS

| Number | Name | Date |
| --- | --- | --- |
| 2,255,126 | Myddleton | Sept. 9, 1941 |
| 2,360,787 | Murphree et al. | Oct. 17, 1944 |
| 2,363,274 | Wolk et al. | Nov. 21, 1944 |
| 2,443,673 | Atwell | June 22, 1948 |
| 2,448,290 | Atwell | Aug. 31, 1948 |
| 2,452,712 | Atwell | Nov. 2, 1948 |
| 2,459,836 | Murphree | Jan. 25, 1949 |
| 2,583,611 | Sullivan | Jan. 29, 1952 |